(12) United States Patent
Hornung et al.

(10) Patent No.: US 6,276,639 B1
(45) Date of Patent: Aug. 21, 2001

(54) APPARATUS FOR LAUNCHING AND DEPLOYING MULTIPLE SATELLITES

(75) Inventors: Ernst Hornung, Stuhr; Huba Ory, Aachen; Andreas Rittweger, Achim; Markus Quadt, Niederkassel; Peter Borgwardt; Joerg Bolz, both of Bremen, all of (DE)

(73) Assignee: DaimlerChrysler Aerospace AG (DE)

( * ) Notice: Subject to any disclaimer, the term of this patent is extended or adjusted under 35 U.S.C. 154(b) by 0 days.

(21) Appl. No.: 09/458,492

(22) Filed: Dec. 9, 1999

(30) Foreign Application Priority Data

Dec. 9, 1998 (DE) ................................. 198 56 670

(51) Int. Cl.$^7$ ...................................... B64G 1/00
(52) U.S. Cl. ...................... 244/158 R; 244/159; 102/489
(58) Field of Search .................. 244/158 R, 159; 102/489

(56) References Cited

U.S. PATENT DOCUMENTS

| | | | |
|---|---|---|---|
| 4,455,943 | * | 6/1984 | Pinson .................................. 102/489 |
| 4,750,423 | * | 6/1988 | Nagabhushan ........................ 89/1.51 |
| 4,854,526 | * | 8/1989 | Rochefort ........................... 244/158 R |
| 5,350,137 | * | 9/1994 | Henley ............................... 244/158 R |
| 5,411,226 | * | 5/1995 | Jones et al. ....................... 244/158 R |
| 5,411,349 | | 5/1995 | Hornung et al. . |
| 5,605,308 | * | 2/1997 | Quan et al. ....................... 244/158 R |
| 5,613,653 | | 3/1997 | Bombled et al. . |
| 5,720,450 | * | 2/1998 | Kanne ............................... 244/158 R |
| 5,884,866 | * | 3/1999 | Steinmeyer et al. ............. 244/158 R |
| 6,138,951 | * | 10/2000 | Budris et al. ..................... 244/158 R |

FOREIGN PATENT DOCUMENTS 4221525   1/1994 (DE) .

* cited by examiner

Primary Examiner—Peter M. Poon
Assistant Examiner—Kevin Jakel
(74) Attorney, Agent, or Firm—W. F. Fasse; W. G. Fasse

(57) ABSTRACT

An apparatus for launching and dispensing multiple satellites into orbit includes a central structure and a plurality of satellites releasably bundled around the central structure to form a cohesive, single payload mounted on an upper stage of a launcher rocket. The central structure includes a central tube and an adapter shell that fits onto the upper stage of the rocket. Each satellite has the shape of a partial cylinder segment of which an outer wall is a cylindrical segment shell. The satellites are bundled and secured together around the central structure by tension bands, whereby the cylindrical segment shells form a load-bearing complete outer cylindrical shell that surrounds the central tube. This structure provides sufficient stiffness and strength to withstand the loads that arise during launch, while having a reduced mass. The satellites themselves, rather than the central structure, bear the loads during launch. This allows the central structure to be of relatively lightweight construction.

19 Claims, 3 Drawing Sheets

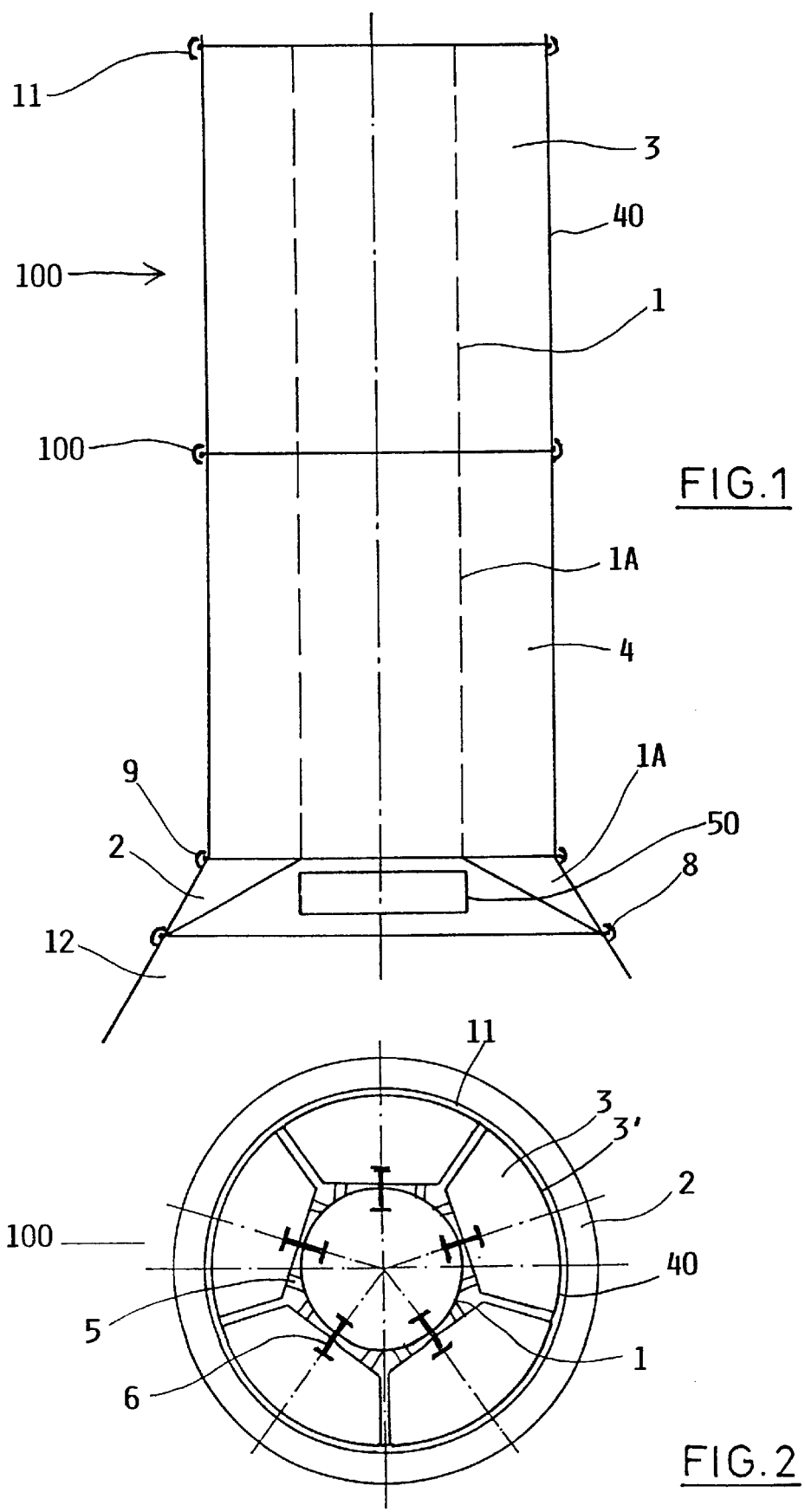

APPARATUS FOR LAUNCHING AND DEPLOYING MULTIPLE SATELLITES

PRIORITY CLAIM

This application is based on and claims the priority under 35 U.S.C. §119 of German Patent Application 198 56 670.0, filed on Dec. 9, 1998, the entire disclosure of which is incorporated herein by reference.

FIELD OF THE INVENTION

The invention relates to an apparatus for launching and deploying multiple satellites into orbit. The satellites are gathered together to form a single payload that is arranged about a central structure and connected by an adapter to a launcher rocket or launch vehicle.

BACKGROUND INFORMATION

Modern telecommunication systems often encompass a series of individual satellites that must be placed respectively into their orbit one after the other according to a pre-established ordering principle. The so-called Constellation Project, for example, provides for launching ten satellites simultaneously with the use of a single launcher rocket. After the rocket reaches the intended orbit, a specially constructed apparatus for placing the satellites in orbit, the so-called "dispenser", then dispenses one satellite after the other into the intended orbit.

In known dispensers the satellites are individually fastened to or on a central primary support structure that then bears the entire loads and forces transmitted during the lift-off, ascent and flight phases of the launch. In an apparatus disclosed in U.S. Pat. No. 5,411,226 (Jones et al.), a total of six satellites are mounted on support plates arranged in a star configuration, in two planes or layers, one above the other. A similar arrangement is disclosed in U.S. Pat. No. 5,613,653 (Bombled et al.). According to this U.S. patent, a central mast or cylinder supports the satellites. In both of the above-mentioned conventional arrangements, the central structure, and not the satellites themselves, bears the thrust and lateral or shear forces that arise during the lift-off, ascent and flight phases of the launch. Consequently, the central structure of these known dispensers must be very stable and, thus, necessarily heavy in order to ensure that it provides the required strength and stiffness.

According to the principle of the known so-called Iridium Dispenser, several satellites are individually fastened to a plate-like adapter disk, and each satellite has its own release mechanism. In this known arrangement, the adapter disk can be provided with a drive unit that is used to position and dispense or deploy each satellite into its intended individual position. The adapter disk and the release mechanism must be relatively heavy in order to satisfy the stiffness and strength requirements. Another variation of this concept does not provide a separate drive unit for the dispenser.

Another known apparatus for launching satellites, which is part of the so-called Globalstar concept, is also based on a central tube to which all payloads are fastened. This relatively thin central tube and an associated soft adapter shell in the form of a flat conical adapter also require a relatively large structural mass in order to fulfill the demands of strength and stiffness to which they are subject.

SUMMARY OF THE INVENTION

In view of the above, it is an object of the invention to provide a payload dispenser for launching and dispensing or deploying satellites into orbit, having the simplest and lightest possible construction, yet providing the greatest degree of strength and stiffness. The invention further aims to avoid or overcome the disadvantages of the prior art and to achieve additional advantages as are apparent from the present specification.

The above objects have been achieved according to the invention, in that each satellite to be launched is assembled having an outer shape, of a partial cylinder shell segment, and in that a plurality of such satellites are bundled and arranged about a central structure to form a single cylindrical payload. In this arrangement, the respective outer shells of the satellites together form a complete outer cylindrical shell stiffened by axial stringers. A respective protruding flange rim or lip in the form of a conical ring segment is provided on the upper and lower edges of the outer shell, respectively, of each respective satellite assembly rack.

The conical ring segments of the satellites arranged in a particular plane about the central structure together form a complete conical ring about the outer cylindrical shell. The satellites are releasably held together in that each conical ring is releasably held together by a tension band having a conical inner structure that fits around the conical ring and encircles the outer shell of the satellites at the respective plane of the conical ring. Conical ring segments are also provided on an adapter shell, which is releasably connected by respective tension bands to the satellites on the one hand, and to the upper stage of the launcher rocket on the other hand.

The underlying principle of the invention is to bundle the satellites in such a way that they form a single cohesive structure that can absorb the large loads placed on the structure during the lift-off and ascent phases of a launch, and transmit these loads into the structure of the launcher rocket. Particularly, the outer cylindrical shell formed by the cylindrical shell segments of the respective satellites, which are releasably joined together by the tension bands, carries the arising loads and transfers those loads through the conical adapter shell directly into the load-bearing outer shell of the launcher rocket. The central structure does not have to be very strong and massive because it does not have to support the significant loads arising during the launch. Bundling the satellites to form a cohesive structure advantageously enables the entire satellite dispensing arrangement to be of particularly light construction.

The preferred embodiment of the invention provides for a total of e.g. ten satellites to be launched into orbit from a single launcher rocket. The satellites are arranged in two stacks one above the other, each stack comprising five satellites. The two stacks of satellites are bundled together to form a single or unitary payload structure.

Various configurations of tension bands and clamps used to fasten satellites to a satellite dispenser are known in the field and are not discussed in detail herein. The inventive apparatus may make use of any such known tension bands and clamps. So-called Marman bands and clamps with a self-acting release mechanism, known particularly from U.S. Pat. No. 5,411,349 (Hornung et al.), may especially be used as the tension bands and clamps for the apparatus of the invention. Other conventional tension bands, however, such as ones that are tangentially pretensioned by tension screws and are pyrotechnically released and discarded after separation from the launcher rockets, can also be used to bundle the satellites to form a single payload structure.

BRIEF DESCRIPTION OF THE DRAWINGS

In order that the invention may be clearly understood, it will now be described in connection with example embodiments, with reference to the accompanying drawings, wherein:

FIG. 1 is a side view of a payload comprising several satellites that are bundled together and are to be placed into orbit;

FIG. 2 is a plan view of the arrangement shown in FIG. 1;

Figure 4:
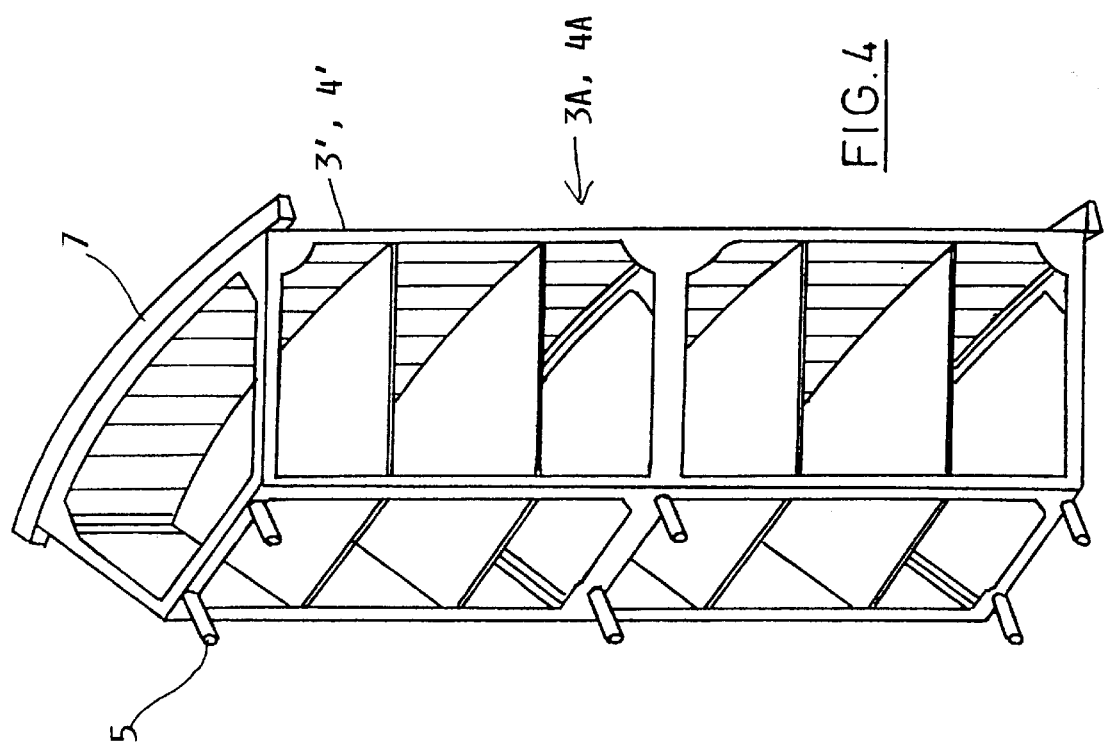
FIG. 4 is a perspective view of the internal satellite structure rack in which components are assembled to form the satellite shown in FIG. 3.

DETAILED DESCRIPTION OF PREFERRED EXAMPLE EMBODIMENTS AND OF THE BEST MODE OF THE INVENTION

A satellite dispenser 100 forming a unitary payload structure as illustrated in FIGS. 1 and 2 has a central structure 1A comprising a central tube 1 constructed as a light cylindrical shell, for example of a light metal alloy or of a composite material, fixedly or rigidly connected to a conical adapter shell 2. The satellite dispenser 100 is mounted on the upper end of the upper stage 12 of a launch vehicle such as a launcher rocket for lifting a plurality of satellites 3, 4 into an orbit. The central structure 1A of the dispenser 100 serves simultaneously as a frame for assembling the satellites 3, 4 in preparation for a satellite launch and as a dispensing vehicle for deploying or dispensing the satellites 3, 4 after reaching the intended orbit.

In the case of the example embodiments described herein, a total of ten satellites are bundled together to form a single payload, as can be seen in FIGS. 1 and 2, whereby five satellites 3 are arranged in an upper layer about the central tube 1, and five satellites 4 are arranged in a lower layer. Each of the satellites 3, 4 is to be released into orbit, either serially one after the other into one orbit, or into separate orbits.

In one example embodiment, the conical adapter shell 2 contains a drive and/or propulsion unit and control module 50 for positioning and dispensing the satellites respectively into the appropriate orbit. In this context the module 50 provides power and control signals for releasing the satellites as will be discussed below, and may provide propulsion for maneuvering the satellite dispenser 100 during the dispensing phase. In another example embodiment, the upper stage 12 of the launcher rocket itself moves the satellites into the proper orbit or orbits and provides the necessary power and control signals for releasing the satellites, so that the adapter shell 2 does not need an independent propulsion unit and control module.

Figure 3:
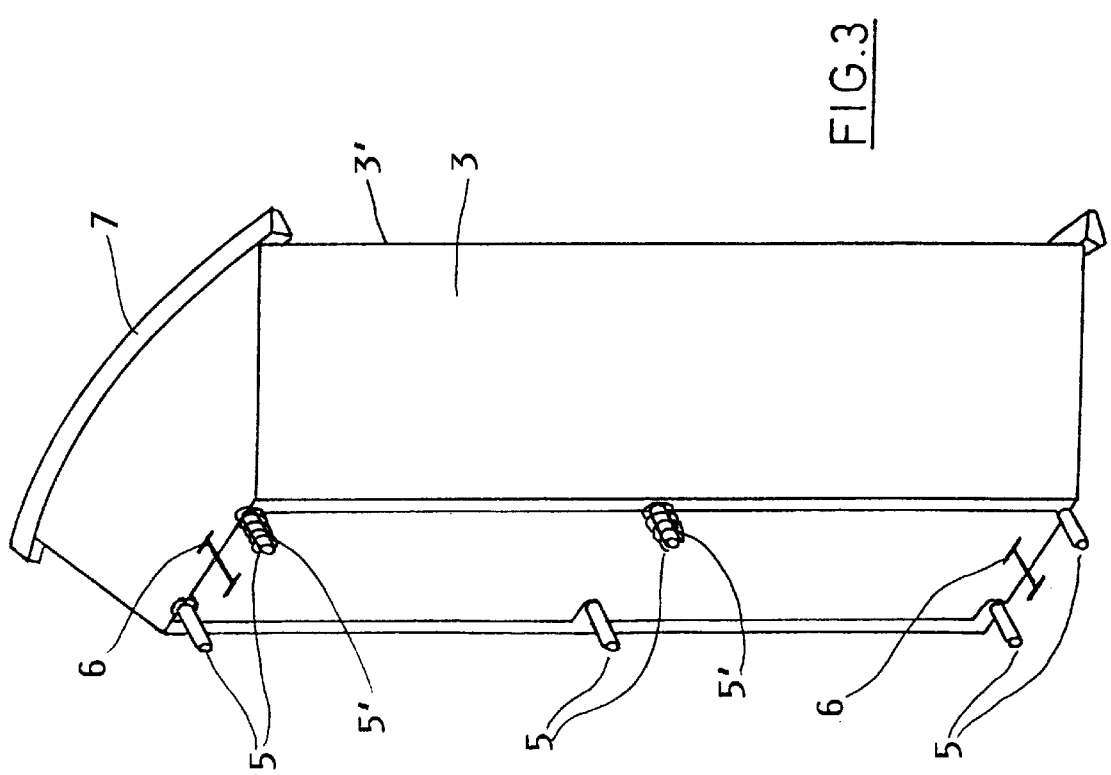
FIG. 3 is a perspective view of a single satellite of the arrangement according to FIG. 1.

To assemble the satellite dispenser 100, each of the satellites 3, 4 is first integrated in its empty structure 3A, 4A. Namely, conventional electronic, electrical, optical, and mechanical components (not shown) making up the satellite are installed in the respective structure. Then, each satellite 3, 4 is pushed radially onto the central tube 1 and is positioned relative to the central tube 1 by six respective centering bolts 5, shown in FIG. 3. Additionally, the satellites 3, 4 are fastened to the central tube 1 at their upper ends and lower ends, respectively, by respective latches 6 that can be pyrotechnically exploded or otherwise released at a later time to release the satellites. The latches 6 are shown in FIGS. 2 and 3. The centering bolts 5 also serve as thrust bolts which partially take up and transmit the lateral forces that act on each satellite 3, 4 during the launch.

As shown especially in FIGS. 3 and 4, conical ring segments 7, also known as Marman ring segments, are mounted or otherwise provided on the upper and lower outer edges respectively of the respective satellites 3, 4. These ring segments 7 will be used for securing together the several satellites 3, 4 to form the satellite dispenser 100 as a unitary payload structure, as follows. After the satellites 3, 4 have been secured to the central tube 1 as described above, then the ring segments 7 of all of the satellites arranged on or adjoining a particular plane about the central tube 1 together form a complete Marman ring at that respective plane and are held together by a respective tension band 8 to 11. The ring segments 7 preferably have the form of a protruding rim or lip with a triangular, conical, or circular segment cross-sectional shape, as shown in FIGS. 3 and 4 for example. When the respective ring segments 7 of all of the satellites 3, 4 on a given plane are joined together and clampingly held by the respective tension band 8 through 11, they form a complete circular ring with a protruding triangular, conical, or circular-segment cross-sectional shape. The tension bands are preferably so-called Marman bands and clamps having corresponding, i.e. mating, triangular, conical or circular-segments inner contour shape that fittingly engages the protruding ring segments 7.

As can be seen in FIG. 1, the three tension bands 9, 10, 11 are used to fasten the satellites 3, 4 to each other and as a unitary payload structure onto the central structure 1A. The tension band 9 also secures the satellites 4 to the adapter shell 2. The tension band 8 fastens the adapter shell 2 to the upper stage 12 of the launcher rocket.

FIG. 2 shows that, in the above-described arrangement, the outer partial cylinder segments of five satellites 3, 4 respectively in two stacks form a large outer cylinder around the central tube 1. Particularly, the outer cylinder segment shells 3', 4' of the satellites 3, 4 together form a complete outer cylindrical shell 40. This outer cylinder and particularly the outer cylindrical shell 40 provides great axial and radial strength and stiffness, although the central structure 1, 2 has less structural mass than in payload dispensers of the prior art. This cylindrical shell 40 is connected directly to the upper stage 12 of the launcher rocket and thus can take up the axial and lateral or shear forces as well as the bending moments acting on the entire payload and can directly transmit these loads into the upper stage 12 of the launcher rocket, and especially into the load bearing outer shell of the upper stage. The overall cylinder formed by the satellites 3, 4 (i.e. not only the outer skin shell 40) also provides load-bearing and load-transmitting strength to the payload structure. Thereby, the unitary payload structure formed by the satellites has a high lengthwise and crosswise strength and stiffness, without requiring additional massive load-bearing structures.

The central tube 1 of the central structure 1A does not bear the large loads that arise during the rocket lift-off and ascent. Rather, these loads are borne by the satellites 3, 4 themselves that are bundled together by the tension bands 9 to 11 to form a single cohesive payload structure that is fixedly yet releasably connected to the adapter shell 2, that in turn is connected to the upper stage 12 of the launcher rocket.

Particularly, the major loads are carried and transmitted by the outer cylindrical shell 40 formed by the satellite cylinder segment shells 3' and 4', through the adapter shell 2 into the outer cylindrical shell of the upper stage 12 of the launcher rocket. Thereby, the satellites 3 of the upper stack directly bear on the satellites 4 of the lower stack. Moreover, in some embodiments, an adapter shell 2 may not be required, if the bundled satellites fit directly onto the upper end of the launcher rocket.

In the preferred embodiment, the connectors that releasably hold the satellites bundled together are the tension bands 8 to 11 which are releasably tensioned or clamped in place by the Marman clamps described in U.S. Pat. No. 5,411,349, the disclosure of which is incorporated herein by reference. The tension bands 8 to 11 can be selectively opened and closed, i.e. released and clamped, by the Marman clamping mechanism disclosed by the above mentioned patent and shown in present FIGS. 5 to 7. Alternatively, the tension bands may be tangentially pretensioned with tension screws or bolts, and then pyrotechnically released in the satellite dispensing phase, and subsequently discarded after the satellites have separated from the launcher rocket.

In a first example embodiment, once the rocket has reached the intended satellite dispensing orbit, the lower tension band 8 is released, so that the satellite dispenser 100 separates from the launcher rocket and flies autonomously on with the satellites 3, 4 to the deployment destination. In this case, the satellite dispenser 100 operates as an autonomous dispenser vehicle including a power, propulsion and control module 50. In an alternative example embodiment, the upper stage 12 of the launcher rocket takes on the function of the dispensing vehicle for maneuvering the satellites 3, 4 into the final dispensing positions and providing the power and control signals necessary for effectuating the deployment of the satellites. In this case, the satellite dispenser 100 does not include its own power, propulsion and/or control module and does not separate from the uppermost stage 12, Rather, the satellites 3, 4 are released into orbit while the central structure 1A remains attached to the rocket.

In either of the above-mentioned embodiments, the three tension bands 9 to 11 holding the satellites are mechanically released directly before the satellites are to be dispensed. To first release the upper row or layer of satellites 3, the uppermost tension band 11 is released and pushed axially upward clear of the satellites 3, and the tension bands 9 and 10 are released and pushed axially downward clear of the satellites 3. At this time, the satellites 3, 4 remain fixedly connected with the central structure 1A by the respective latches 6 that are attached to the upper and lower ends of the satellites 3, 4, respectively. These latches 6 can be pyrotechnically released in any manner known in the art, when the respective satellites 3, 4 are ready to be dispensed.

After the upper row or stack of satellites 3 has been dispensed from the dispenser 100 by pyrotechnically releasing the associated latches 6, the tension band 10 is pushed upward so as not to interfere with the lower row or layer of satellites 4, which can now be dispensed into orbit by pyrotechnically releasing the respective associated latches 6. In this context, it can be understood that the central tube merely needs to be strong enough to support the rather low forces that arise during the drifting and low-thrust maneuvering in orbit while dispensing the satellites, after the tension bands have been released.

Figure 5:
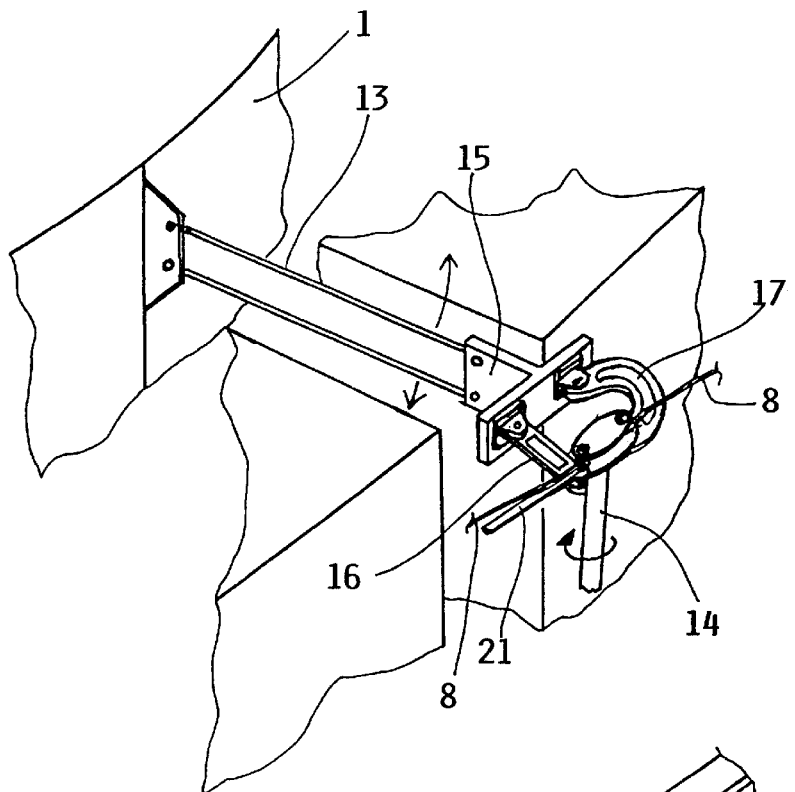
FIG. 5 is a detailed perspective view of the release mechanism for the tension bands used in the arrangement shown in FIG. 1.
Figure 6:
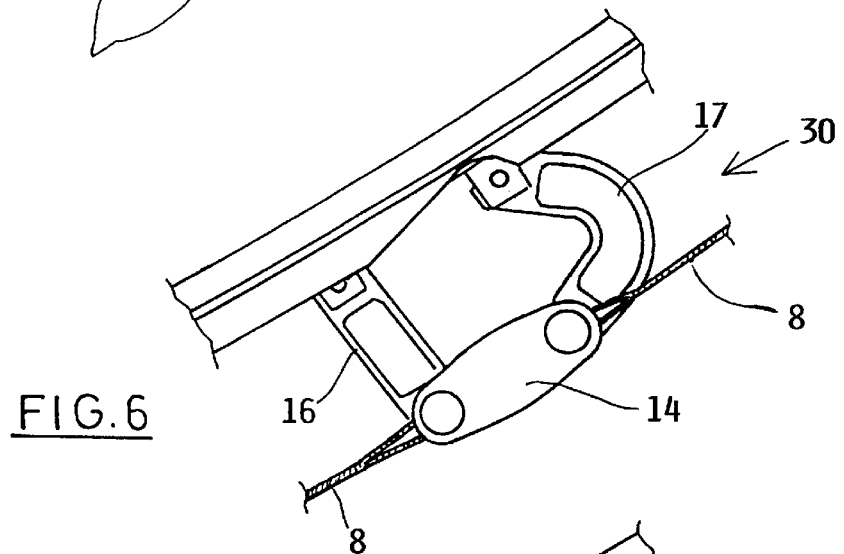
FIG. 6 is an enlarged detailed plan view of the release mechanism of FIG. 5.
Figure 7:
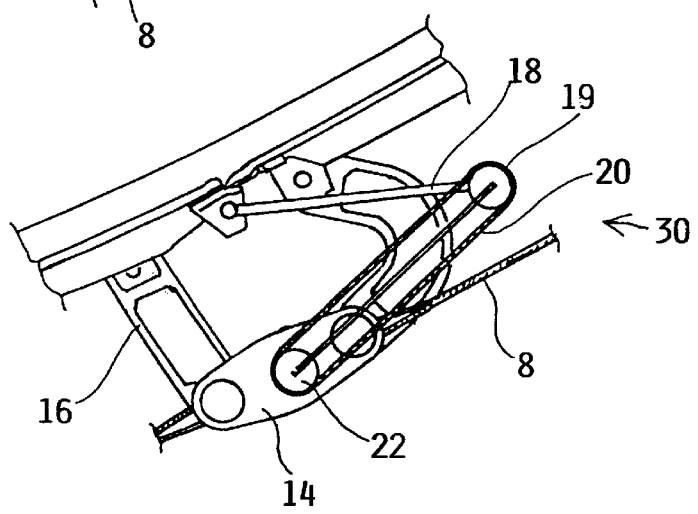
FIG. 7 is a view similar to that of FIG. 6, but shows a motor drive arrangement together with the release mechanism.

The tension band mechanical release mechanism 30 illustrated in FIGS. 5 to 7 has the advantage that it opens absolutely shock-free and is effective for releasing the tension bands as well as moving the tension bands up or down as discussed above. The release mechanism 30 is attached to the central tube 1 by a pivot arm 13 that can pivot upward and/or downward when the respective tension band 9 to 11 has been released from the lips or rims of the two-part Marman ring formed by the conical ring segments 7, thereby moving the respective tension band 9 to 11 away from the respective satellites 3, 4 to be dispensed. To allow such an arrangement, the pivot arm protrudes along a radial plane outwardly from the central tube 1, between two circumferentially adjacent ones of the satellites. The pivot arm 13 may be a single rigid arm with single pivot points at the opposite ends thereof, or may include two rigid linkage rods with two pivot points at opposite ends thereof so as to form a parallelogram pivot that keeps the release mechanism 30 properly oriented at all times.

Since there must be a gap between the circumferentially adjacent satellites to allow the pivot arm 13 to extend and pivot therebetween as described above, these satellites are not circumferentially in contact with each other along their entire facing surfaces. For this reason, the pivot arm 13 also includes a stiff spacer member or force-transmitting plate provided as a part of the pivot bracket 15, which allows forces to be transmitted circumferentially and axially in shear between the adjacent non-continuous Marman rings and between the adjacent non-continuous shell segments 3', 4'. In other words, this stiff spacer member or plate is tightly circumferentially squeezed between the respective circumferentially adjacent satellites while they are bundled together by the tension bands. This stiff spacer is shifted clear of the respective satellites together with the pivot arm 13 after the respective Marman clamp has been opened to release the tension band 9 to 11 from the conical Marman ring segments 7. In this context, it can be understood that the satellites 3, 4 do not form an absolutely complete uninterrupted circular cylinder shell in the bundled condition, but rather a substantially complete and continuous cylindrical shell that is partially interrupted or includes gaps as necessary for the pivot arms 13 and pivot brackets 15 as described above. As long as a circumferential and shear force transmission is provided, for example by the spacer plates mentioned above, then the advantages of bundling the satellites according to the invention can be achieved.

The respective satellites 3, 4 are dispensed from the dispenser 100 by exploding the respective latches 6 that are attached to or near the upper and lower edges of the satellites 3, 4. Simultaneously, pretensioned springs 5' (kick-off springs) arranged respectively on the centering bolts 5 apply an outwardly directed radial force to the respective satellites 3, 4 to move them away from the central tube 1. A radial guide, not shown, which functions similarly to the tracks of a telescoping drawer assembly, is used to ensure that the satellites 3, 4 move away from the central tube 1 in an orderly fashion.

FIGS. 5 to 7 illustrate the Marman ring-type tension bands 8 to 11 in a released or de-tensioned state. To clamp or apply tension to a respective band 8 to 11, a lever 14 of the release mechanism 30, which pivotally takes up both ends of the respective tension band 8 to 11 is turned approximately 180° in the clockwise direction (as seen from above). One end of a pendular support 18 is rotatably mounted on the pivot bracket 15, which also pivotally supports swivel arms 16, 17. The other end of the pendular support 18 carries an electric stepper motor 19.

This stepper motor 19 rotationally drives a gear belt 20, which in turn rotates a gear 22 with which the belt 20 is engaged. The gear 22 is fixed to the lever 14 (directly or via a shaft) so as to rotate the lever 14 while the lever 14 articulates or pivots with the swing arms 16 and 17 in such a manner so as to pull the opposite ends of the tension band 8 to 11 closer toward each other and then past each other, thereby applying tension to the tension bands and clamping the bands tightly around the bundled satellites 3, 4. Releasing the tension bands 8 through 11 is achieved by rotating the stepper motor in an opposite direction, so as to rotate the lever 14 counterclockwise. Alternatively, or additionally, a lever 21 may be connected to the lever 14 to lock or unlock the lever 14. Reference should also be made to the disclosure of U.S. Pat. No. 5,411,349 in this context. Power and control signals for operating the stepper motor 19 and for exploding the latches 6 are provide by the power and control module 50 arranged in the adapter shell 2 or in the launcher rocket.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A system for launching and deploying satellites, comprising:
   a central structure including a central tube;
   a plurality of satellites that each respectively include a respective cylindrical segment shell, and that are arranged in a bundled arrangement around and braced against said central tube and respectively braced against one another such that said respective cylindrical segment shells of said satellites together form an at least substantially complete and continuous cylinder shell; and
   at least one connector that releasably holds said satellites together in said bundled arrangement around and braced against said central tube and respectively braced against one another;
   wherein said central tube is not strong enough to bear and does not bear all loads of supporting said satellites during a launch of said satellites, wherein said satellites directly bear and transmit a majority of said loads through at least said cylindrical segment shells of said satellites that together form said cylinder shell, and wherein said central tube is strong enough to support said satellites during a deployment phase after said launch.

2. The system according to claim 1, wherein each respective one of said satellites comprises a load-bearing internal structure and a plurality of satellite components selected from electrical components, electronic components, power supplies, optical components, radio transmitter and receiver components, mechanical components, and control units, which are installed in said internal structure, and wherein said internal structure includes a frame and said respective cylindrical segment shell of said respective satellite.

3. The system according to claim 2, wherein said substantially complete and continuous cylinder shell, which is formed of said cylinder segment shells respectively bearing against one another and is thereby stiffened, is arranged and adapted to bear a majority of all loads of supporting said satellites during a launch of said satellites.

4. The system according to claim 1, wherein said central tube is a hollow circular cylindrical tube.

5. The system according to claim 1, wherein said central structure further includes a conical adapter shell extending from an end of said central tube, wherein said conical adapter shell has on a first end thereof a first inner diameter corresponding to a diameter of said central tube and a first outer diameter corresponding to an outer diameter of said substantially complete and continuous cylindrical shell formed by said satellites, and wherein said conical adapter shell has on a second end thereof opposite said first end, a second outer diameter corresponding to an outer diameter of an outer cylindrical shell of a launch rocket to which said adapter shell is adapted to be connected.

6. The system according to claim 1, wherein said plurality of satellites includes respective first and second stacks of said satellites respectively arranged at different axial locations along an axial length of said central tube, wherein said satellites of said first stack are in contact with and connected directly in a load-transmitting manner to said satellites of said second stack.

7. The system according to claim 6, wherein each said stack includes a number of said satellites, touching each other tangentially.

8. The system according to claim 1, wherein said central structure further includes an adapter unit, which comprises a conical adapter shell connected to and radially outwardly flaring from an end of said central tube to an enlarged outer diameter of a free end of said adapter shell, and a power and control unit including a power source, a propulsion thruster, and a control unit adapted to control said propulsion thruster and adapted to release said connector.

9. The system according to claim 1, further comprising a launch rocket including a load-bearing cylindrical outer shell, wherein said satellites in said bundled arrangement are releasably connected to a nose end of said launch rocket by a force-transmitting connection between said satellites and said load-bearing cylindrical outer shell of said launch rocket.

10. The system according to claim 9, wherein said central structure further includes a conical adapter shell having a narrower-diameter end connected to an end of said central tube and releasably connected to said satellites, and a wider-diameter end releasably connected to said cylindrical outer shell of said launch rocket, wherein said adapter shell provides said force-transmitting connection.

11. A system for launching and deploying satellites, comprising:
    a central structure including a central tube;
    a plurality of satellites that each respectively include a respective cylindrical segment shell, and that are arranged in a bundled arrangement around and braced against said central tube and respectively braced against one another such that said respective cylindrical segment shells of said satellites together form an at least substantially complete and continuous cylinder shell; and
    at least one connector that releasably holds said satellites together in said bundled arrangement around and braced against said central tube and respectively braced against one another;
    wherein each one of said satellites further comprises a load-bearing ring-segment-shaped flange rim along at least one edge of said respective cylindrical segment shell; and
    wherein said at least one connector comprises at least one tension band that releasably encircles and engages said flange rims of said satellites and thereby circumferentially holds together said satellites in said bundled arrangement.

12. The system according to claim 11, wherein said central structure further includes a conical adapter shell that has a first end connected to an end of said central tube and a second end adapted to be releasably connected to an outer cylindrical shell of a launch rocket, wherein said first and second ends of said adapter shell each respectively comprise circular ring-shaped flange rims, wherein said ring-segment-shaped flange rims of said satellites mate with said ring-shaped flange rim of said first end of said adapter shell to form a complete securing ring, wherein a respective one of said at least one tension band releasably encircles, engages and holds together said ring-segment-shaped flange rims of said satellites and said ring-shaped flange rim of said adapter shell together forming said complete securing ring, and wherein said ring-shaped flange rim of said second end of said adapter shell is adapted to be releasably connected to a rim of the outer cylindrical shell of the launch rocket by another one of said at least one tension band.

13. The system according to claim 11, wherein said plurality of satellites includes a first group of satellites arranged at a first axial location along said central tube and a second group of satellites arranged at a second axial location displaced from said first axial location along said central tube, wherein said ring-segment-shaped flange rims of said satellites of said second group mate in a load-bearing manner with said ring-segment-shaped flange rims of said satellites of said first group to form a complete connection ring, and wherein a respective one of said at least one tension band releasably encircles, engages and holds together said ring-segment-shaped flange rims forming said complete connection ring and thereby releasably connects said satellites of said second group with said satellites of said first group in a load bearing manner.

14. A system for launching and deploying satellites, comprising:
a central structure including a central tube;
a plurality of satellites that each respectively include a respective cylindrical segment shell, and that are arranged in a bundled arrangement around and braced against said central tube and respectively braced against one another such that said respective cylindrical segment shells of said satellites together form an at least substantially complete and continuous cylinder shell; and
at least one connector that releasably holds said satellites together in said bundled arrangement around and braced against aid central tube and respectively braced against one another;
wherein each said satellite includes a satellite body and plurality of spacer studs protruding from said satellite body, and wherein each said satellite is arranged with free ends of said spacer studs in contact with and braced against said central, tube and with said satellite body spaced away from said central, tube by said spacer studs.

15. The system according to claim 14, wherein said spacer studs are not connected to said central tube, and further comprising pyrotechnically releasable latches releasably connecting said satellites to said central tube.

16. The system according to claim 14, further comprising kick-off springs interposed between said satellite bodies and said central tube, wherein said springs are pre-loaded to exert a radially outwardly directed biasing force urging said satellite bodies radially outwardly away from said central tube and preventing self-locking.

17. A system for launching and deploying satellites, comprising:
a central structure including a central tube;
a plurality of satellites that each respectively include a effective cylindrical segment shell, and that are arranged in bundled arrangement around and braced against said central tube and respectively braced against one another such that said respective cylindrical segment shells of said satellites together form an at least substantially complete and continuous cylinder shell; and
at least one connector that releasably holds said satellites together in said bundled arrangement around and braced against said central tube and respectively braced against one another;
wherein said at least one connector respectively comprises a tension band that releasably encircles and circumferentially holds together said satellites in said bundled arrangement, and a tension clamp including a tensioning lever that is connected to two opposite ends of said tension band and is adapted to be rotated so as to apply a clamping tension circumferentially to said tension band.

18. The system according to claim 17, further comprising a pivot arm having a fixed end pivotally connected to said central tube and a free end opposite said fixed end, and further comprising a pivot bracket connected to said free end, wherein said tension clamp is mounted on said pivot bracket and said pivot arm protrudes outwardly from said central tube along a radial plane between two circumferentially adjacent ones of said satellites.

19. The system according to claim 18, wherein said pivot bracket includes a load-bearing plate arranged and circumferentially transmitting compression and shear loads between said circumferentially adjacent satellites.

* * * * *

UNITED STATES PATENT AND TRADEMARK OFFICE
CERTIFICATE OF CORRECTION

PATENT NO. : 6,276,639 B1
DATED : August 21, 2001
INVENTOR(S) : Hornung et al.

It is certified that error appears in the above-identified patent and that said Letters Patent is hereby corrected as shown below:

Title page,
Under Item [75], "Inventors", replace "Ory" by -- Oery --;

Column 3,
Line 11, after "structure", delete -- rack --;

Column 7,
Line 15, after "6 are", replace "provide" by provided --;

Column 9,
Line 47, after "against", replace "aid" by -- said --.

Column 10,
Line 19, before "cylindrical", replace "effective" by -- respective --;
Line 20, after "arranged", replace "in bundled" by -- in a bundled --.

Signed and Sealed this

Eleventh Day of June, 2002

Attest:

Attesting Officer

JAMES E. ROGAN
Director of the United States Patent and Trademark Office